United States Patent
Brouwer

(10) Patent No.: US 9,475,724 B2
(45) Date of Patent: Oct. 25, 2016

(54) SODA-LIME GLASS FROM 100% RECYCLED GLASS-FORMING MATERIALS

(71) Applicant: Owens-Brockway Glass Container Inc., Perrysburg, OH (US)

(72) Inventor: Robert Brouwer, Berkel en Rodenrijs (NL)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 396 days.

(21) Appl. No.: 14/089,066

(22) Filed: Nov. 25, 2013

(65) Prior Publication Data

US 2015/0147497 A1 May 28, 2015

(51) Int. Cl.
| | | |
|---|---|---|
| *C03C 3/04* | (2006.01) | |
| *C03C 1/00* | (2006.01) | |
| *C03C 4/02* | (2006.01) | |
| *C03C 3/087* | (2006.01) | |
| *C03B 9/00* | (2006.01) | |
| *C03B 25/00* | (2006.01) | |
| *B65D 1/02* | (2006.01) | |

(52) U.S. Cl.
CPC .............. *C03C 3/04* (2013.01); *B65D 1/023* (2013.01); *B65D 1/0207* (2013.01); *C03B 9/00* (2013.01); *C03B 25/00* (2013.01); *C03C 1/002* (2013.01); *C03C 3/087* (2013.01); *C03C 4/02* (2013.01); *B65D 2565/384* (2013.01); *C03C 2204/00* (2013.01); *Y02W 30/803* (2015.05); *Y10T 428/131* (2015.01)

(58) Field of Classification Search
CPC ........... C03C 3/04; C03C 1/002; C03C 4/02; C03C 2204/00; C03C 9/00; C03B 25/00; B65D 1/023; B65D 1/0207; B65D 2565/384; Y02W 30/803; Y10T 428/131
See application file for complete search history.

(56) References Cited

U.S. PATENT DOCUMENTS

| | | |
|---|---|---|
| RE26,328 E | 1/1968 | Monks |
| 3,725,022 A | 4/1973 | Mills |
| 5,718,737 A | 2/1998 | Mosch |
| 6,230,521 B1 | 5/2001 | Lehman |
| 6,763,280 B1 | 7/2004 | Lehman |
| 6,810,301 B2 | 10/2004 | Lehman |
| 7,383,695 B2 | 6/2008 | Lehman |
| 7,386,997 B2 | 6/2008 | Lehman |
| 7,565,816 B2 | 7/2009 | Lehman et al. |
| 7,900,475 B2 | 3/2011 | Lehman et al. |
| 7,900,476 B2 | 3/2011 | Lehman et al. |
| 2005/0064117 A1 | 3/2005 | Lehman |
| 2006/0101856 A1 | 5/2006 | Lehman et al. |
| 2006/0122725 A1 | 6/2006 | Duffy et al. |
| 2011/0081458 A1 | 4/2011 | McDonald |
| 2011/0203319 A1 | 8/2011 | Lehman |
| 2012/0046411 A1 | 2/2012 | Kulshrestha et al. |

FOREIGN PATENT DOCUMENTS

| | | |
|---|---|---|
| BE | 562023 A | 5/1960 |
| GB | 936944 | 9/1963 |
| JP | 2001048578 A | 2/2001 |

OTHER PUBLICATIONS

Bourgeois, Jean-Yves, Title: Heinz Glas Launches "New Age Glass" Premium Beauty News www.premiumbeautynews.com 2012 (4pgs).
The Natural Abode website, Catorgory: Recycled Glassware—Kitchenware, Dec. 18, 2012 (7pgs).
Heritage Mint, Ltd. website, Catorgory: Jamie Oliver Recycled Glass, Dec. 18, 2012 (3pgs).
Simpson, W. Title: The Redox Number Concept and its Use by the Glass Technologist, Glass Technology vol. 19 No. 4 Aug. 4, 1978 (4pgs).
Heinz New Age Glass information page Heinz-Glaz GmbH, Glashuttenplatz 1-7, 96355 Kleintettau, Germany new_age©heinz-glas.com, www.heinz-glas.com.
Dalmijn, W. L. and Vanhouwelingen, J. A., "Glass Recycling", International Symposium on Recycling of Metals and Engineered Materials, Nov. 15, 1995, pp. 993-1011, XP008058398.
Schaeffer, H. A: "Recycling of Cullet and Filter Dust in the German Glass Industry", Glass Science and Technology, Deutsche Glastechnische Gesellschaft, Offenbach, DE, vol. 69, No. 4, Apr. 1, 1996, pp. 101-106, XP000583801, ISSN: 0946-7475.
PCT Int. Search Report and Written Opinion, Int. Serial No. PCT/US2014/061345, Int. Filing Date: Oct. 20, 2014, Applicant: Owens-Brockway Glass Container Inc., Mail Date: Jan. 7, 2015.

*Primary Examiner* — Anthony J Green
*Assistant Examiner* — Elizabeth A Bolden

(57) ABSTRACT

A method of making soda-lime glass using 100 wt % cullet as the glass forming materials is disclosed. Also disclosed is a soda-lime glass container made according to this method.

12 Claims, 1 Drawing Sheet

SODA-LIME GLASS FROM 100% RECYCLED GLASS-FORMING MATERIALS

The present disclosure relates to a process for making soda-lime glass. The disclosed process uses recycled glass as the glass-forming materials. Soda-lime glass containers made by the disclosed process are also described.

BACKGROUND AND SUMMARY OF THE DISCLOSURE

Soda-lime glass, also called soda-lime-silica glass, is prevalent in the manufacture of glass containers and other articles. Such glass is comprised of three main oxide constituents: silica ($SiO_2$), soda ($Na_2O$), and lime (CaO) that are provided by the glass forming materials. Other oxides may also be present in smaller amounts. These additional oxides may include one or more of alumina ($Al_2O_3$), magnesia (MgO), potash ($K_2O$), iron oxide ($Fe_2O_3$), titanium oxide ($TiO_2$), sulfur trioxide ($SO_3$), and oxides of selenium, cobalt, chromium, manganese, and lead. A typical soda-lime glass composition may include, for example, about 60 wt. % to about 75 wt. % silica, about 10 wt. % to about 18 wt. % soda, about 5 wt. % to about 15 wt. % lime, and optionally about 0-2 wt. % alumina ($A_2O_3$), about 0-4 wt. % magnesia (MgO), about 0-1.5 wt. % potash ($K_2O$), about 0-1 wt. % iron oxide ($Fe_2O_3$), about 0-0.5 wt. % titanium oxide ($TiO_2$), and about 0-0.5 wt. % sulfur trioxide ($SO_3$).

Soda-lime glass may be made by melting a batch of primary or glass-forming materials, and optional secondary or additive materials, and then cooling the resultant melt. The glass-forming materials are the materials from which the soda-lime glass derives its main oxide content—namely, the silica, soda, and lime content—and thus its amorphous physical state. There are generally two types of glass-formers or glass-forming materials: (1) virgin raw materials (sand, soda ash, and limestone), and (2) recycled glass or "cullet" as it is termed in the industry. Traditionally, the batch of primary or glass-forming materials used to make soda-lime glass could include some cullet—usually 10-40 wt. %, and up to 80 wt. %—with the rest being virgin raw materials. The use of greater amounts of cullet and lesser amounts of virgin raw materials has proven difficult to implement for many reasons, including limited color options, unstable melt temperatures in the melt furnace, and difficulties in achieving a uniform mix of cullet and virgin raw materials in the melt furnace.

If used, the secondary, additive materials provide the soda-lime glass with more stable quality. For example, additive materials may enable better aesthetic properties, such as color, and/or other physical qualities, such as seed (i.e., bubble) prevention and "redox" number adjustment. They do not include main oxide constituent glass forming materials of the soda-lime glass. Some notable secondary, additive materials include colorants, decolorants, fining agents, oxidizers, and reducers. The colorants and decolorants can be used to provide the soda-lime glass with a variety of colors including flint (colorless), amber, green, and blue. The fining agents can be used to prevent the incorporation of bubbles in the soda-lime glass. These agents work by removing insoluble gas bubbles—typically oxygen—from the soda-lime glass melt before it cools and hardens. The oxidizers and reducers can be used to manage the "redox number" of the soda-lime glass melt as desired.

A general object of the present disclosure is to provide a process for making soda-lime glass in which 100 wt. % of the glass-forming materials is cullet.

The present disclosure embodies a number of aspects that can be implemented separately from or in combination with each other.

In accordance with one aspect of the present disclosure, a glass food and beverage container is constructed of 100 wt. % recycled content selected from the group consisting of post-industrial cullet, post-consumer cullet, and a combination thereof.

A process for making a soda-lime glass container, in accordance with another aspect of the present disclosure, includes the step of preparing a soda-lime glass batch that includes cullet. The cullet is pre-sorted by color. The cullet, moreover, constitutes 100 weight percent of the glass-forming materials that are present in the soda-lime glass batch. The process for making the soda-lime glass container also includes the steps of melting the soda-lime glass batch into a soda-lime glass melt, and forming a hollow glass container from the soda-lime glass melt.

A process for making soda-lime glass, in accordance with yet another aspect of the present disclosure, includes the step of preparing a soda-lime glass batch that includes cullet. The cullet is pre-sorted by color. The cullet, moreover, constitutes 100 weight percent of the glass-forming materials that are present in the soda-lime glass batch. The process for making the soda-lime glass also includes the steps of melting the soda-lime glass batch into a soda-lime glass melt, forming soda-lime glass from the soda-lime glass melt, annealing the soda-lime glass, and cooling the soda-lime glass.

In accordance with still another aspect of the present disclosure, a glass container includes a soda-lime glass wall that provides the container with a body, a circumferentially-closed base at one end of the body, and a mouth at another end of the body opposite the circumferentially-closed base. The soda-lime glass wall has a glass composition that includes a main oxide content of about 60-75 wt. % $SiO_2$, about 10-18 wt. % $Na_2O$, and about 5-15 wt. % CaO. This main oxide content of the soda-lime glass wall glass composition is derived only from cullet.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
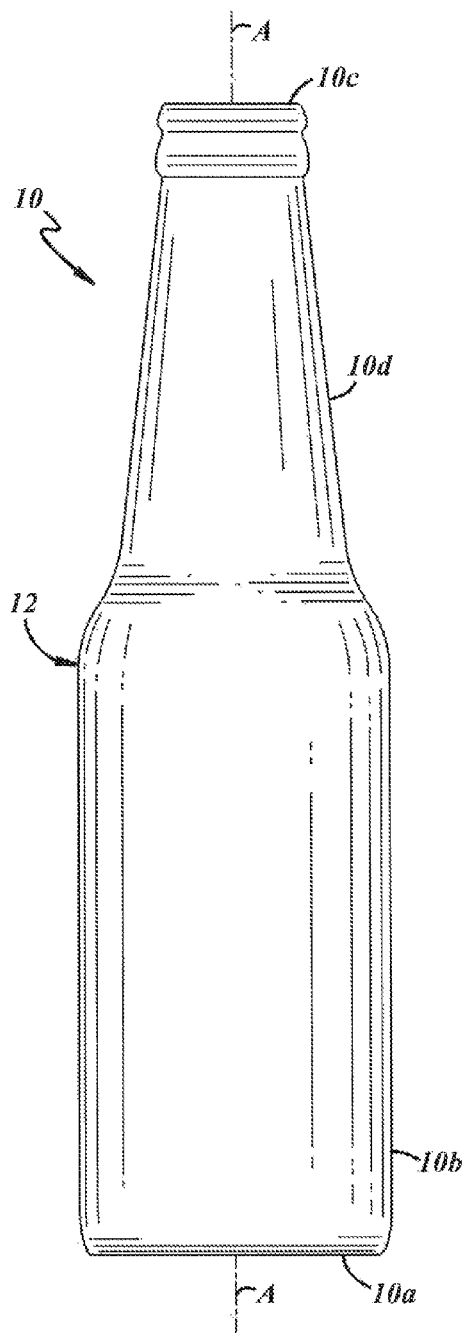
FIG. 1 illustrates an illustrative embodiment of a glass container 10 that may be produced in accordance with an illustrative embodiment of a presently disclosed manufacturing process.

FIG. 1 illustrates an illustrative embodiment of a soda-lime glass container 10 (hereafter "glass container" or "container") that may be produced by the process described below. The glass container 10 includes a soda-lime glass wall 12 that has a glass composition. The soda-lime glass wall 12 provides the container 10 with a longitudinal axis A, a base 10a at one axial end of the container 10 that is closed in an axial direction, a body 10b extending in an axial direction from the axially closed base 10a, and a mouth 10c at another axial end of the container 10 opposite of the base 10a. Accordingly, the soda-lime glass container 10 is hollow. In the illustrated embodiment, the soda-lime glass wall also provides the container 10 a neck 10d that may extend axially from the body 10b, may be generally conical in shape, and may terminate in the mouth 10c. The container 10, however, need not include the neck 10d. The body 10b may terminate at the mouth 10c such as, for instance, in a soda-lime glass jar embodiment. The body 10b may be of any suitable shape in cross-section transverse to the axis A as long as the body 10b is circumferentially closed.

The glass container 10, and many others like it, may be formed from primary, glass-forming materials, and optional secondary, additive materials, as indicated above. The term "cullet" is used broadly in the present disclosure to mean previously-made glass as well as any contaminants that may be present as a result of the prior use, storage, and/or processing of the glass. For example, some contaminants that may be found include dirt, residual adhesive, container content stains, etc. The glass-forming materials do not include any of the virgin raw minerals that have conventionally been used to make soda-lime glass, such as sand, soda ash and limestone. The use of 100 wt. % cullet as the glass-forming materials has several ecological implications including lower energy consumption per manufactured container 10, a reduction in raw mineral use as compared to previous glass forming methods, and a reduction in greenhouse gas emissions per manufactured container 10. In the presently disclosed process, the glass-forming materials used constitute 100 wt. % cullet. In other words, the primary, glass-forming materials include cullet and substantially no virgin raw materials. As used herein, the terminology "substantially no virgin raw materials" does not exclude accidental carryover of some trace amounts of virgin raw materials or some de minimus use thereof to circumvent literal infringement.

Figure 2:
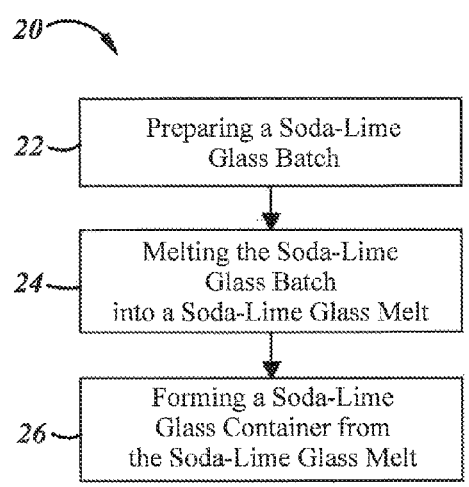
FIG. 2 is a flow diagram that illustrates an illustrative process for making the glass container 10 shown in FIG. 1 as well many other kinds of glass containers.

Referring now to FIG. 2, the process 20 for making the glass container 10 may include preparing a soda-lime glass batch (step 22), melting the soda-lime glass batch into a soda-lime glass melt (step 24), and forming the glass wall 12 that defines the shape of container 10 from the soda-lime glass melt (step 26). This process 20 can be used to make the glass container 10 in a wide variety of sizes and shapes. For example, the process can be used to make beverage bottles—including beer and liquor bottles—as well as jars and other glass containers that are designed to hold some content in their interiors.

The soda-lime glass batch may be prepared (step 22) by gathering the cullet which provides the primary, glass-forming materials and, optionally, adding secondary, additive materials to the glass batch. Most of the cullet may be provided in broken glass chunks, shards, pieces, or the like, whose largest dimension may be approximately 70 mm to 90 mm in diameter, with the majority of the cullet particle sizes ranging from 10 mm to 70 mm in diameter, whereas virgin glass batch particles are typically less than 2 mm in diameter. To provide more thorough distribution within the batch, the additive materials may be premixed with smaller grain size cullet and then that mixture can be added to larger cutlet upstream of the melt furnace. More specifically, some portion of the cullet can be provided in a powdered or other small form, for example, closer in particle size to the secondary additive materials.

The glass-forming materials are comprised of 100 wt. % cullet. The secondary, additive materials may include colorants, decolorants, fining agents, oxidizers, reducers, or any other additive that does not contribute to the main oxide content of the soda-lime glass. If secondary, additive materials are used, the soda-lime glass batch may be comprised of at least 98 weight percent (wt. %)—preferably at least 99 wt. %—cullet with the remainder being the secondary, additive materials. At least some of the additive materials may be recycled materials. For example, at least some carbon content may be from recycled carbon. In another example, sodium sulfate and/or selenium may be from materials recycled from filter dust from the glass manufacturing facility, for example, from an electrostatic precipitator downstream of a dry scrubber. In a further example, at least some iron or aluminum content may be from recycled furnace slag. In such cases, the recycled content of the glass batch may exceed 99%.

The cullet may be post-consumer or post-industrial recycled glass. The term "post-consumer" recycled glass includes glass from municipal or commercial recycling efforts including, for example, glass from bottles, glassware, windows, and solar panels. The term "post-industrial" recycled glass includes production glass such as internal waste glass from the same glass-producing factory that is manufacturing the glass container 10, external waste glass from another glass-producing factory, or glass from some other industrial setting. Most of the cullet may be provided in broken glass chunks or shards whose largest dimension may be approximately 70 mm to 90 mm in diameter. In a preferred embodiment, at least some of the cullet is provided as a powder.

The cullet is preferably pre-sorted, based on color, so that a level of contaminants does not exceed a certain amount. An embodiment of permissible pre-sorted cullet includes: 40-50 wt. % green glass, 40-50 wt. % flint glass, 5-15 wt. % amber glass, 0-2 wt. % blue glass and other colored glass, and less than 100 grams/ton of non-soda lime container glass. Additionally, the pre-sorted cullet of this embodiment preferably includes less than 1000 grams/ton of organics including soluble organics, like sugars, as well as visible free organics, like pieces of plastics. More particularly, the pre-sorted cullet preferably includes less than 500 grams/ton of visible free organics.

The color of glass cullet is generally a function of its redox number and the presence and identity/amount of certain compounds (oxide) in the glass, as is well understood in the art. The redox number of a particular glass is basically a measure of its oxidation/reduction state when in melt form. One accepted technique for quantifying the redox number is described in Simpson and Myers, "The Redox Number Concept and Its Use by the Glass Technologist," *Glass Technology*, Vol. 19, No. 4, Aug. 4, 1978, pages 82-85. In general, molten glass having a redox number of zero and above is considered "oxidized," and a molten glass having a negative redox number is considered "reduced." Table 1 below describes some examples of prevalent glass colors that are routinely encountered in the glass manufacturing industry, including some specific shades thereof.

TABLE 1

| Glass Color | Color affecting Compound(s) | Redox Number |
| --- | --- | --- |
| GREEN | | |
| Emerald Green | Chromium oxide | −10 to +1 |
| Georgia Green | Chromium oxide | |
| Dead Leaf Green | Chromium oxide | |
| Champagne Green | Chromium oxide | |
| French Green | Chromium oxide | |
| Antique Green | Chromium oxide | |

TABLE 1-continued

| Glass Color | Color affecting Compound(s) | Redox Number |
|---|---|---|
| FLINT | Iron oxide, Selenium | +2 to +20 |
| AMBER | Iron, sulfur, excess carbon | −40 to −20 |
| BLUE & OTHERS | | |
| Arctic Blue | Cobalt oxide | +2 to +20 |
| Cobalt Blue | Cobalt oxide | −20 to +10 |

The pre-sorted cullet provides the glass composition of the soda-lime glass wall 12 with its main oxide content of $SiO_2$, $Na_2O$, and $CaO$, and its amorphous physical properties. The glass composition of the soda-lime glass wall 12 includes about 60-75 wt. % $SiO_2$, about 10-18 wt. % $Na_2O$, and about 5-15 wt. % $CaO$. Also included in the cutlet may be a small amount of other oxides or impurities, which are typical in the glass manufacturing industry, that become incorporated into the glass composition of the manufactured soda-lime glass wall 12. These materials may be present in the soda-lime glass wall 12 composition, via the cullet, in amounts up to about 2.0 wt. %. Some common additional materials that may be present include $Al_2O_3$, $MgO$, $K_2O$, $Fe_2O_3$, $TiO_2$, $BaO$, $SrO$, $SO_3$, and oxides of selenium, cobalt, chromium, manganese, and lead. Other materials besides those just mentioned may also be present.

The secondary, additive materials, if used, are mixed with the glass-forming materials to influence the aesthetic and other physical qualities of the soda-lime glass wall 12. The term "physical qualities" as used here refers to qualities of the soda-lime glass wall 12 that can be achieved without altering the main oxide content of its glass composition in a substantial way. For example, certain secondary, additive materials can be added to the soda-lime glass batch to affect the color and fining of the manufactured soda-lime glass wall 12 without changing the main oxide content of its glass composition. The secondary, additive materials are preferably provided in powder form to facilitate easy mixing with the cullet.

Colorants and decolorants are secondary, additive materials that will affect the color of the soda-lime glass wall 12. Colorants are compounds that produce a color in the soda-lime glass wall 12 other than flint, and decolorants are compounds that mask colors. Examples of suitable colorants may include, for example, iron oxides (e.g., $FeO$ and/or $Fe_2O_3$), chromium oxides (e.g., $CrO$ or $Cr_2O_3$), cobalt oxides (e.g., $CoO$ or $Co_2O_3$), nickel, copper, selenium, manganese, titanium, and/or a combination of sulfur, iron, and carbon. Some of the different colors that can be promoted by these colorants are listed above in Table 1. Examples of suitable decolorants may include, for example, selenium, manganese, manganese dioxide, and cerium oxide. Selenium and manganese can both be used at low concentrations to neutralize the green tint often present in glass as a result of iron impurities. At higher concentrations, however, selenium and manganese begin to promote a reddish-pink color (peach) and a purple color, respectively.

Fining agents are secondary, additive materials that help prevent bubble or seed formation in the soda-lime glass wall 12. One example of a fining agent includes the combination of a metal sulfate, such as sodium sulfate ($Na_2SO_4$), and carbon. When present in the soda-lime glass melt, sodium sulfate and carbon react to produce sulfur dioxide ($SO_2$) and carbon dioxide ($CO_2$). Both $SO_2$ and $CO_2$ are gasses that are insoluble in the glass melt. As such, these gasses rise up through the molten soda-lime glass and encounter smaller insoluble gas bubbles typically composed of oxygen ($O_2$). The $SO_2$ gas reacts with the $O_2$ gas to form sulfur trioxide ($SO_3$), which is soluble in the soda-lime glass melt, while the $CO_2$ gas picks up the $O_2$ gas and drags it to the surface of the glass melt where they are released.

Oxidizers and reducers are secondary, additive materials that would render the redox number of the soda-lime glass melt more "oxidized" or "reduced," respectively. These additive materials can be included in the soda-lime glass batch to modify, if desired, the redox number of the soda-lime glass melt that would result from the pre-sorting of the cullet. Some examples of oxidizers include calcium sulfate ($CaSO_4$), sodium nitrate ($NaNO_3$), and potassium nitrate ($KNO_3$), while some examples of reducers include iron pyrite ($FeS_2$) and graphite. Some additive materials, moreover, can function as both a fining agent and an oxidizer/reducer. For example, sodium sulfate and carbon, which in combination act as a fining agent, can also make the redox number of the soda-lime glass melt more oxidized and more reduced, respectively.

The soda-lime glass batch may be melted (step 24) in one or more furnaces to produce the soda-lime glass melt. The temperature of the furnace(s) is set to ensure proper melting of the glass batch according to known practices. For example, to produce the soda-lime glass melt, the glass batch may melted in the furnace(s) at a temperature about 50° C. lower than the temperature of a melt of a typical glass batch (with 30-40 wt. % cullet) which is usually between about 1400° C. and about 1500° C., at a typical residence time of about two to four hours. After achieving its melt form, the soda-lime glass melt may flow from the furnace(s) into a refiner, where it is conditioned, and then to one or more forehearths.

The soda-lime glass container 10 (step 26) may then be formed from the soda-lime glass melt by a glass-blowing procedure. A feeder located at a downstream end of the one or more forehearths, for example, may measure and deliver a gob of the soda-lime glass melt to a glass-forming machine. The gob may then be formed into the soda-lime glass wall 12 at an individual section machine by a press-and-blow process, a blow-and-blow process, or any other suitable process. Once formed, the soda-lime glass wall 12 is initially cooled to preserve its desired shape, and then annealed in one or more an annealing lehrs. The soda-lime glass wall 12 may be annealed at a hot-end portion of the annealing lehr(s) at a temperature between about 550° C. and about 600° C. for about 30 minutes to about 90 minutes, and then gradually cooled at a cold-end portion to between about 65° C. and about 130° C. Any of a variety of hot-end, cold-end, antireflective, and/or glass strengthening coatings may be applied to the exterior of the soda-lime glass wall 12 anytime after being formed.

EXAMPLE

A soda-lime glass batch was prepared that included 100 wt. % cullet as the glass-forming materials. The cullet used was supplied as a mixture of several different types of glass. Specifically, the supplied cullet included the following mixture: 40-48 wt. % green glass, 42-50 wt. % flint glass, 6-14 wt. % amber glass, and 0-2 wt. % blue glass. The supplied cullet also included less than 250 g/ton of opal glass, less than 1000 g/ton of organics, less than 100 g/ton of plastics, less than 25 g/ton of ceramics, less than 5 g/ton of magnetic metals, and less than 5 g/ton of non-magnetic metals.

There thus has been disclosed a process for making soda-lime glass that fully achieves all of the objects and aims previously set forth. The disclosure has been presented in conjunction with presently preferred embodiments, and alternatives and modifications have beep discussed. Other alternatives and modifications readily will suggest themselves to persons of ordinary skill lit the art in view of the foregoing description. The disclosure is intended to embrace all such modifications and variations as fall within the spirit and broad scope of the appended claims.

The invention claimed is:

1. A process of making a soda-lime glass container, which includes the steps of:
    (a) preparing a soda-lime glass batch that includes cullet, the cullet being pre-sorted by color to have 40-50 wt. % green glass, 40-50 wt. % flint glass, 5-15 wt. % amber glass, 0-2 wt. % blue glass and other colored glass, and less than 250 grams/ton of non-soda lime container glass, and wherein the cullet constitutes 100 wt. % percent of the glass-forming materials that are present in the soda-lime glass;
    (b) melting the soda-lime glass batch into a soda-lime glass melt; and
    (c) forming a soda-lime glass container from the soda-lime glass melt.

2. The process set forth in claim 1, wherein the cullet comprises post-consumer recycled glass.

3. The process set forth in claim 1, wherein the cullet comprises post-industrial recycled glass.

4. The process set forth in claim 1, wherein soda-lime glass batch further includes secondary, additive materials.

5. The process set forth in claim 4, wherein the secondary, additive materials includes at least one of colorants, decolorants, fining agents, oxidizers, reducers, or a combination thereof.

6. The process set forth in claim 4, wherein the soda-lime glass batch includes at least 98 wt. % cullet and the remainder secondary, additive materials.

7. The process set forth in claim 6, wherein the soda-lime glass batch includes at least 99 wt. % cullet.

8. A process of making soda-lime glass, which includes the steps of:
    (a) preparing a soda-lime glass batch that includes cullet, the cullet being pre-sorted by color to have 40-50 wt. % green glass, 40-50 wt. % flint glass, 5-15 wt. % amber glass, 0-2 wt. % blue glass and other colored glass, and less than 250 grams/ton of non-soda lime container glass, and wherein the cullet constitutes 100 wt. % percent of the glass-forming materials that are present in the soda-lime glass;
    (b) melting the soda-lime glass batch into a soda-lime glass melt;
    (c) forming soda-lime glass from the soda-lime glass melt;
    (d) annealing the soda-lime glass at a temperature between about 550° C. and about 600° C. for about 30 minutes to about 90 minutes; and
    (e) cooling the soda-lime glass from the annealing temperature.

9. The process set forth in claim 8, wherein soda-lime glass batch further includes secondary, additive materials.

10. The process set forth in claim 9, wherein the secondary, additive materials includes at least one of colorants, decolorants, fining agents, oxidizers, reducers, or a combination thereof.

11. The process set forth in claim 9, wherein the soda-lime glass batch includes at least 98 wt. % cullet and the remainder secondary, additive materials.

12. The process set forth in claim 8, wherein step (c) comprises forming a soda-lime glass wall into a hollow soda-lime glass container shape that includes a body, a circumferentially-closed base at one end of the body, and a mouth at another end of the body opposite the circumferentially-closed base.

* * * * *